US011991804B2

(12) United States Patent
Squillace et al.

(10) Patent No.: US 11,991,804 B2
(45) Date of Patent: May 21, 2024

(54) AUTOMATIC LENGTH DETECTION LIGHTING DEVICE

(71) Applicant: SIGNIFY HOLDING B.V., Eindhoven (NL)

(72) Inventors: Jorge Gabriel Squillace, Eindhoven (NL); Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/926,329

(22) PCT Filed: May 20, 2021

(86) PCT No.: PCT/EP2021/063453
§ 371 (c)(1),
(2) Date: Nov. 18, 2022

(87) PCT Pub. No.: WO2021/239570
PCT Pub. Date: Dec. 2, 2021

(65) Prior Publication Data

US 2023/0199929 A1 Jun. 22, 2023

(30) Foreign Application Priority Data

May 25, 2020 (EP) .................................... 20176221

(51) Int. Cl.

| | |
|---|---|
| ***H05B 45/10*** | (2020.01) |
| ***H05B 45/12*** | (2020.01) |
| ***H05B 45/40*** | (2020.01) |

(52) U.S. Cl.
CPC ............. *H05B 45/40* (2020.01); *H05B 45/12* (2020.01)

(58) Field of Classification Search
CPC ........ H05B 45/12; H05B 45/24; H05B 45/30; H05B 45/40; H05B 45/50; H05B 45/52; H05B 45/54; H05B 45/185; H05B 45/325; H05B 45/3725
See application file for complete search history.

(56) References Cited

U.S. PATENT DOCUMENTS

| | | | | |
|---|---|---|---|---|
| 8,299,719 | B1 | 10/2012 | Moshirnoroozi | |
| 9,370,066 | B2 * | 6/2016 | Han ........................ | H05B 45/46 |
| 9,401,600 | B2 * | 7/2016 | Zhang ..................... | H05B 47/24 |
| 10,440,786 | B1 * | 10/2019 | Stoegner ................. | H05B 45/52 |
| 11,026,306 | B2 * | 6/2021 | Nicolaides ............. | H05B 45/44 |
| 2010/0231404 | A1 | 9/2010 | Duine et al. | |

(Continued)

FOREIGN PATENT DOCUMENTS

| | | | |
|---|---|---|---|
| JP | 2004247231 | A | 9/2004 |
| JP | 2010282983 | A | 12/2010 |
| JP | 2012195252 | A | 10/2012 |

*Primary Examiner* — Tung X Le

(57) ABSTRACT

A lighting device comprising a lighting unit comprising a plurality of lighting modules and a termination module, wherein the termination module is configured to have an electrical characteristic different from that of each lighting module, such that it draws a different amount of current in response to an applied drive voltage. The present invention suggests automatically determining a lighting module count of the lighting unit upon detection of the termination module, by measuring a change of a current passing through the lighting unit while sequentially activating the modules of the lighting unit.

15 Claims, 3 Drawing Sheets

(56) References Cited

U.S. PATENT DOCUMENTS

| | | | | |
|---|---|---|---|---|
| 2011/0101889 | A1 | 5/2011 | Lys | |
| 2012/0074918 | A1* | 3/2012 | Shimomura | H05B 47/185 323/282 |
| 2015/0042925 | A1* | 2/2015 | Hu | H05B 45/54 315/192 |
| 2015/0327350 | A1 | 11/2015 | Van Der Brug | |
| 2015/0334791 | A1* | 11/2015 | Cao | G09G 5/10 315/192 |

* cited by examiner

AUTOMATIC LENGTH DETECTION LIGHTING DEVICE

CROSS-REFERENCE TO PRIOR APPLICATIONS

This application is the U.S. National Phase application under 35 U.S.C. § 371 of International Application No. PCT/EP2021/063453, filed on May 20, 2021, which claims the benefit of European Patent Application No. 20176221.8, filed on May 25, 2020. These applications are hereby incorporated by reference herein.

FIELD OF THE INVENTION

The present invention relates to a variable length lighting device comprising a plurality of lighting units, e.g., a pixelated lighting unit. Specifically, the present invention relates to automatic length detection of such a lighting device.

BACKGROUND OF THE INVENTION

Lighting devices are widely used to achieve practical or decorative lighting effects. Traditionally, incandescent light bulbs are commonly used as light sources in both household and commercial lighting. However, they have been replaced by other types of lighting sources, e.g., light-emitting diodes (LEDs), due to their low efficiencies.

Nowadays, a lighting device often comprises a high number of lighting modules connected in parallel or in series. Each lighting module has a light source and can be independently controlled by a controller, e.g., via a data bus. The characteristics of the light emitting by the lighting source of each lighting module, e.g., the intensity and the color, may be controlled, in order to generate static or dynamic graphics elements, to achieve a desired practical and/or decorative lighting effect.

Such a lighting device normally comprises a lighting unit having either a fixed length (a fixed number of lighting modules), or a variable length. In order to control the lighting device to achieve a desired lighting effect, e.g., displaying entertainment contents on a scene, a lighting module count (a number of the lighting modules of the lighting unit), also known as a length, of a variable length lighting unit must be known.

There are known ways to determine the lighting module count of a variable length lighting unit. For example, the lighting module count may be counted and manually input into the lighting device or a system connected to the lighting device. However, it increases the complexity of maintenance as human interaction is always needed. Further, this method is less reliable as manual processing may introduce errors.

Alternatively, the lighting module count may be automatically determined by a calibration process, e.g., by switching on and off different groups of the lighting modules. Since the emitted light caused by switching on and off the lighting modules during the calibration process is visible to the user, the calibration can only be performed when the lighting device is not in use. Otherwise, the emitted light caused by the calibration process may degrade the desired practical and/or decorative lighting effect.

It would be desirable to provide a lighting device with an automatic length detection without human interaction, which is invisible to the user.

SUMMARY OF THE INVENTION

It is an object of the present invention to provide a lighting device with automatic length detection, which is not perceived by a user.

According to a first aspect of the invention, this and other objects are achieved by a lighting device comprising: a lighting unit comprising a plurality of lighting modules and a termination module for terminating the light unit, wherein the plurality of lighting modules and the termination module are connected in parallel or in series, and each lighting module comprises a light source for emitting light; and a controller for controlling the lighting unit, wherein the plurality of lighting modules and the termination module are independently controllable by the controller; a power supply unit for providing a drive voltage to the lighting unit; wherein the termination module is configured to have an electrical characteristic different from that of each lighting module, such that an amount of current drawn by the termination module in response to an applied drive voltage differs from that drawn by each lighting module in response to the applied drive voltage; wherein the controller is configured to: activate at least one module of the lighting unit individually according to a preselected addressing scheme; measure a change of a current passing through the lighting unit while activating the at least one module; detect the termination module based on the measured change of the current; determine a lighting module count of the lighting unit upon detection of the termination module.

The modules may be connected in parallel or in series. Whether the modules are connected in parallel or in series may depend on a protocol used by the controller.

The term "electrical characteristic" may refer to different electrical properties of a unit or a component. For example, it may refer to electrical resistance, capacitance and/or inductance of the unit or the component.

The term "addressing scheme" may refer to a scheme for individually controlling the modules of the lighting unit. For example, the addressing scheme may determine in what order the modules are controlled, and/or which state (switching on/off, different colors and/or intensities, etc.) each module is to be changed to. According to different addressing schemes, the controller may control the lighting unit to ensure a substantially invisible count detection process.

With this design, the lighting module count (i.e. number of lighting modules) can be determined in a both accurate and robust manner, without any human interactions. The termination module may be connected to a lighting unit of any existing lighting device having controllers using any types of protocols, without modification to the lighting device, which is flexible.

The preselected addressing scheme may be configured to activate modules of the lighting unit sequentially, in an order from a $1^{st}$ lighting module of the lighting unit until a last module of the lighting unit being the termination module; and wherein when a different amount of change of the current caused by an activation of a present mth module is detected, the present mth module may be determined to be the termination module. Here, m is an integer and $m>1$. Consequently, the lighting module count equals to $m-1$.

The term "sequentially" may refer to that the modules of the lighting unit are activated one by one in an order. For example, the lighting units may be activated one by one from a lowest order lighting module, i.e. the $1^{st}$ lighting module of the lighting unit, to the highest order unit, i.e. the last termination unit.

The count detection operation may be "hidden" in a desired lighting effect, e.g., an initialization of lighting device, such that the count detection operation is "invisible" to the user as he would not perceive the count detection operation. That is, although the count detection operation causes visible lighting effects, due to that these lighting effects are a part of the expected or desired lighting effects, the count detection operation is considered to be "invisible" to the user.

The controller may be configured to keep an activated module of the lighting unit being activated when another module of the lighting unit is activated. The count detection operation may be "hidden" in the initialization of lighting device.

The controller may be configured to deactivate an activated module of the lighting unit before another module of the lighting unit being activated. The count detection operation may be "hidden" in a moving flashing effect, e.g., during the initialization of lighting device.

A predetermined maximum of lighting module count may be N, and the lighting module count may be less than N. The preselected addressing scheme may be configured to activate modules of the lighting unit sequentially, in an order from a last module slot of the lighting unit being a Nth module slot until the termination module; wherein when a change of the current passing through the lighting unit caused by an activation of a present mth module is detected, the present mth module may be determined to be the termination module.

The lighting modules of the lighting unit may be activated sequentially one by one in an order, from the highest possible order module until the termination module.

Consequently, the lighting module count equals to a number of the lighting modules that have not been activated, i.e. m−1.

As the termination module (the mth module) is the only module of the lighting unit being activated, none of the 1$^{st}$ to (m−1)th lighting modules, is activated during the count detection operation. That is, the count detection operation would not generate any visible lighting effect. Consequently, the count detection operation is "invisible" to the user.

For example, when the term "activated" refers to "switching on", since only the termination module is switched on (no light emitting) and none of the plurality of the lighting modules are switched on, the user would not perceive the count detection operation. Consequently, the count detection operation may be performed without being visible to the user.

The lighting module count may be determined based on a position number m of the termination unit.

The term "position number" m may refer to a number m corresponding to the position of the module within the lighting unit. For example, if a module having a position number 10 is determined to be the termination module, then it is known that the termination module is the 10$^{th}$ module of the lighting unit, which is also the last module of the lighting unit. Consequently, the lighting module count, i.e. the number of the lighting modules of the lighting unit is 9 (i.e. 10−1).

Since each module of the lighting unit is independently controllable by the controller, the controller may have a unique ID associated to each module for individually addressing the module. Thus, upon detection of the mth module being the termination module, the position number m may be determined based on the unique ID for addressing the termination module. Thus, the lighting module count may be determined without using any additional circuits, e.g., a counter. This may both simplify the design of the lighting device and reduce the manufacturing cost of the lighting device.

The lighting module count may be determined based on a number of modules and/or module slots of the lighting unit having been activated according to the preselected addressing scheme.

The number of the lighting modules and/or module slots been activated may be counted by a counter.

The term "activate" is relative. The term "activate" may refer to "switch on" a module. Consequently, the term "deactivate" may refer to "switch off" the module. When the module is activated, in response to the drive voltage applied over the module, it draws a current. When the module is deactivated, it stops drawing current as the drive voltage applied over the module is cut off. For example, the modules of the lighting unit may be all off before the count detection operation performed by the controller, and then they may be "activated" by switching on, sequentially one by one. The count detection operation may be performed in an "initializing" phase. That is, the lighting unit is OFF before the count detection operation is performed.

Alternatively, the terms "activate" and "deactivate" may also refer to "switch off" and "switch on" the module, respectively. Analogously, when the module is activated, it stops drawing current as the drive voltage applied over the module is cut off. When the module is deactivated, in response to the drive voltage applied over the module, it draws a current. For example, the modules of the lighting unit may be all on before count detection operation performed by the controller, and then they may be "activated" by switching off, sequentially one by one.

According to a second aspect of the invention, this and other objects are achieved by a method for detecting a lighting module count of a lighting device, the lighting device comprising: a lighting unit comprising a plurality of lighting modules and a termination module for terminating the light unit, wherein the plurality of lighting modules and the termination module are connected in parallel or in series, and each lighting module comprises a light source for emitting light; and a controller for controlling the lighting unit, wherein the plurality of lighting modules and the termination module are independently controllable by the controller; a power supply unit for providing a drive voltage to the lighting unit; wherein the termination module is configured to have an electrical characteristic different from that of each lighting module, such that an amount of current drawn by the termination module in response to an applied drive voltage differs from that drawn by each lighting module in response to the applied drive voltage; wherein the method comprises: activating at least one module of the lighting unit individually according to a preselected addressing scheme; measuring a change of a current passing through the lighting unit while activating the at least one module; detecting the termination module based on the measured change of the current; determining a lighting module count of the lighting unit upon detection of the termination module.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
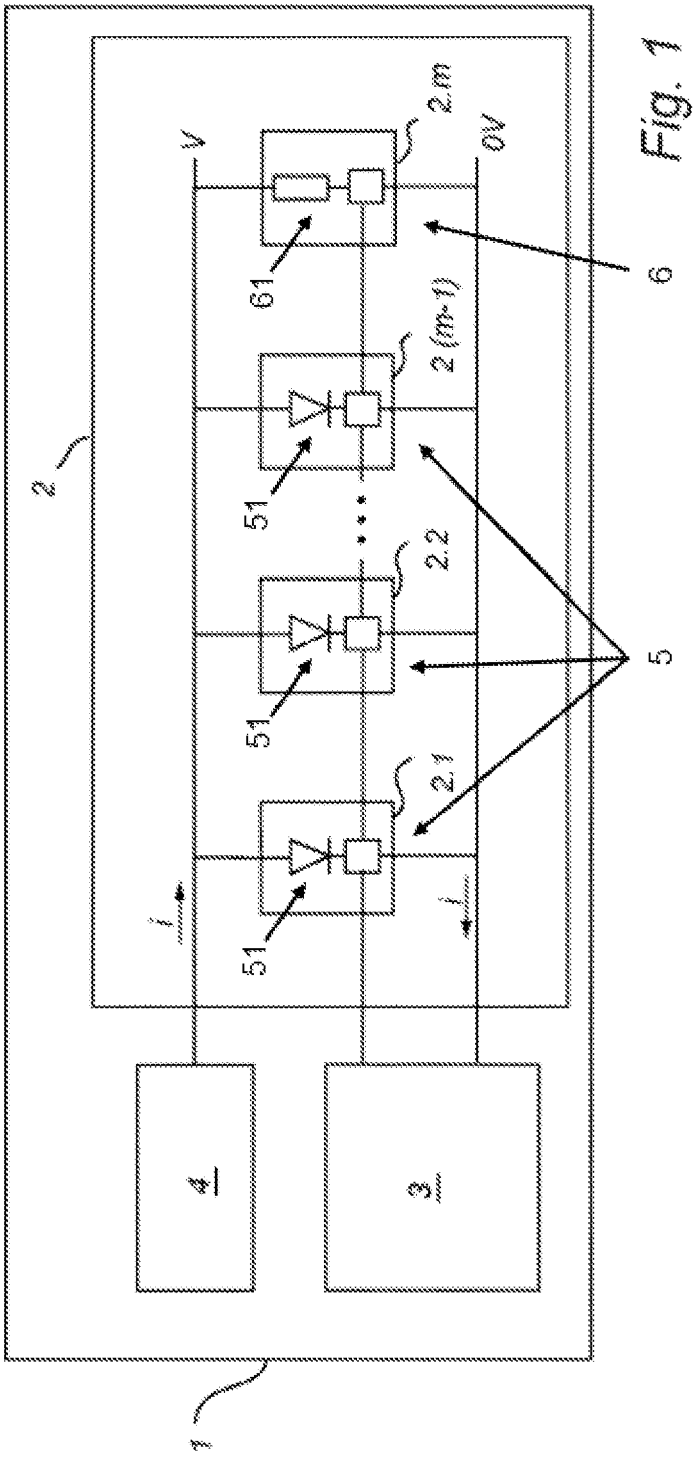
FIG. 1 schematically shows a lighting device according to an embodiment of the present invention.

FIG. 1 is a schematic circuit diagram of a lighting device 1 according to an embodiment of the present invention. The lighting device 1 comprises a lighting unit 2, a controller 3, and a power supply unit (PSU) 4.

The lighting unit 2 comprises a plurality of lighting modules 5 connected in parallel in addressable positions 1-(m−1), respectively. The lighting module 5 in a position x of the lighting unit 2 is denoted 5.*x* (x=1, 2, . . . , m−1). The lighting unit 2 further comprises a termination module 6 in an addressable position m as a last module for terminating the lighting unit 2. The termination module 6 may be connected to an open end of the plurality of lighting modules 5 connected in parallel. The modules 5, 6 of the lighting unit 2 may be arranged in a linear fashion, such that the lighting unit 2 may be in a form of a lighting strip. Each lighting module 5 may be a pixelated light module. The lighting unit 2 may be a pixelated light strip.

Each lighting module 5 comprises a light source 51 for emitting light. The light source 51 may comprise a light emitting diode (LED), as shown in FIG. 1. The light source 51 may comprise a plurality of LEDs connected in series. The light source 51 may comprise a plurality of LEDs connected in parallel. The light source 51 may comprise an array of LEDs, wherein groups of LEDs connected in series are connected in parallel, i.e. series-parallel LED connection.

The termination module 6 may be in a form of a physical attachment. The termination module 6 may replicate any of the lighting modules 5 while having the light source 51 replaced. That is, the termination module 6 may be a lighting module the same as any one of the lighting modules 5, but having its light source 51 replaced by a different component 61. In this way, the termination module 6 may be addressable and controllable as the lighting modules 5.

The replacement component 61 has a different electrical characteristic such that an amount of current drawn by the termination module 6 in response to an applied drive voltage V differs from that drawn by each lighting module 5 in response to the applied drive voltage V. For example, the electrical characteristic of the termination module 6 may comprise a resistance. The replacement component 61 may be a load, e.g., having a different resistance R' comparing to a resistance R of the lighting module 5, such that it draws a different amount of current in response to the applied drive voltage V. Based on the different amount of current it draws, it is possible to detect the termination module 6 when a transition of status of the termination module 6 happens, e.g., when the termination module 6 is switched on, and when the termination module 6 is switched off.

For example, the termination module 6 may be created by providing a lighting module 5, and replacing its light source 51 by a different component 61 having a different resistance R' from that of a resistance R of the lighting module 5, such that the terminal unit 6 may draw a different amount of current.

Here, replacing the light source 51 by the component 61 may refer to disconnecting the light source 51 of the lighting module 5 and connecting the component 61 instead. The disconnected light source 51 may be removed from the termination module 6 or remain disconnected within the termination module 6.

In the illustrated example, each module 5, 6 of the lighting unit 2 comprises a module controller 52 for communicating with the controller 2 and controlling the respective module 5, 6. Each module 5, 6 of the lighting unit 2 here comprises a switch 53 for switching on and/or switching off an applied drive voltage V over the respective module 5, 6.

The PSU 4 may provide a drive voltage V to the lighting unit 2. Each module 5, 6 of the lighting unit 2 may draw a current in response to the applied drive voltage V.

The controller 3 may use a protocol to individually control each module 5, 6 of the lighting unit 2. For example, the protocol can be any of 1-wire Serial Peripheral Interface (SPI), 2-wire SPI, 4 wire SPI, and $I^2C$ (Inter-Integrated Circuit). The controller 3 can independently control each module 5, 6 of the lighting unit 2. The controller 3 may be connected to each module 5, 6 of the lighting unit 2 in different ways, e.g., via a data bus. The controller 3 may be directly connected to each module 5, 6 of the lighting unit 2. Alternatively, the controller 3 may be directly connected to one or a few modules of the lighting unit 2, while the other modules not directly connected to the controller 3 may be connected to the controller 3 indirectly, e.g., via another module directly or indirectly connected to the controller 3.

For example, as shown in FIG. 1, the controller 3 is directly connected to the lighting module 5.1 of the lighting unit 2, while the other modules 5.2-5.(m−1), 6 are connected to the controller 3 indirectly, via the directly and/or indirectly connected modules. Here, the termination module 6 in FIG. 1 is connected to the controller 3 via all of the lighting modules 5.1-5.(m−1). That is, in this example, although the powering of the modules 5, 6 is in parallel, the data buses connecting the controller 3 and the modules 5, 6 are connected in series through the modules 5, 6. Whether the modules 5, 6 are connected in parallel or in series may depend on the protocol used by the controller. The controller 3 may comprise a sensor 31 for measuring a change of a current passing through the lighting unit 2. The sensor 31 may be an integrated part of the controller 3, as shown in FIG. 1. The sensor 31 may be a separate apparatus electrically connected to the controller 3. The sensor 31 may comprise an ammeter.

The controller 3 may comprise an interface 32 for receiving data, via a wire or wirelessly. The data may comprise instructions to the controller 3. The instructions may comprise the preselected addressing scheme.

The lighting device 1 may comprise a memory unit 7 for storing information. The memory unit 7 may be a separate unit, as shown in FIG. 1, or an integrated part of the controller 3. The stored information may comprise operation parameters of the lighting device 1, and/or parameters of the modules 5, 6.

The currents drawn by lighting modules 5 may be the same or different, as long as the current drawn by the termination module 6 differs from the current drawn by any of the lighting modules 5. However, for simplicity, it is assumed that the current drawn by any of the lighting modules 5 is the same. The current drawn by the termination module 6 may be higher or lower than the current drawn by the lighting module 5. The current drawn by the termination module 6 may be at least 20% higher or lower than the current drawn by the lighting module 5. The current drawn by the termination module 6 may be at least 30%, preferably 50% higher or lower than the current drawn by the lighting module 5.

The current $I_{module}$ drawn by the lighting module 5 may be expressed as:

$$I_{modeul} = \frac{V - V_f}{R},$$

wherein V refers to the applied voltage, $V_f$ refers to a voltage over the light source 51, e.g., a forward voltage of the light source 51 being a LED, R refers to the resistance of the lighting module 5. Here, since the light source 51 is a LED, the resistance of the LED is ignored.

The current $I_{termin}$ drawn by the termination module 6 may be expressed as:

$$I_{termin} = \frac{V}{R'},$$

wherein V refers to the applied voltage, R' refers to the resistance of the termination module 6.

A relationship between the current drawn by the lighting module 5 and the current drawn the termination module 6 can be:

$$I_{module} \gg I_{termin}, \text{ or}$$

$$I_{module} \gg I_{termin}.$$

The operation parameters of the lighting device 1 may comprise the applied voltage V, the current $I_{module}$ drawn by the lighting module 5, and the current $I_{termin}$ drawn by the termination module 6. The parameters of the modules 5, 6 may comprise the voltage over the light source $V_f$, the resistance R of the lighting module 5, the resistance R' of the termination module 6. The operation parameters of the lighting device 1, and/or the parameters of the modules 5, 6 may be stored in the memory unit 7.

According to the present invention, the controller 3 is configured to activate at least one module 5, 6 of the lighting unit 2 individually according to a preselected addressing scheme; to measure a change of a current (i) passing through the lighting unit 2 while activating the at least one module; to detect the termination module 6 based on the measured change of the current; and to determine a lighting module count of the lighting unit 2 upon detection of the termination module 6.

The term "addressing scheme" may refer to a scheme for individually controlling the modules 5, 6 of the lighting unit 2. For example, the addressing scheme may determine in what order the modules 5, 6 are controlled, and/or which state (switching on/off, different colors, intensities, etc.), each module 5, 6 is to be changed to. According to different addressing schemes, the controller 3 may control the lighting unit 2 to ensure a substantially invisible lighting module count detection.

Figure 2:
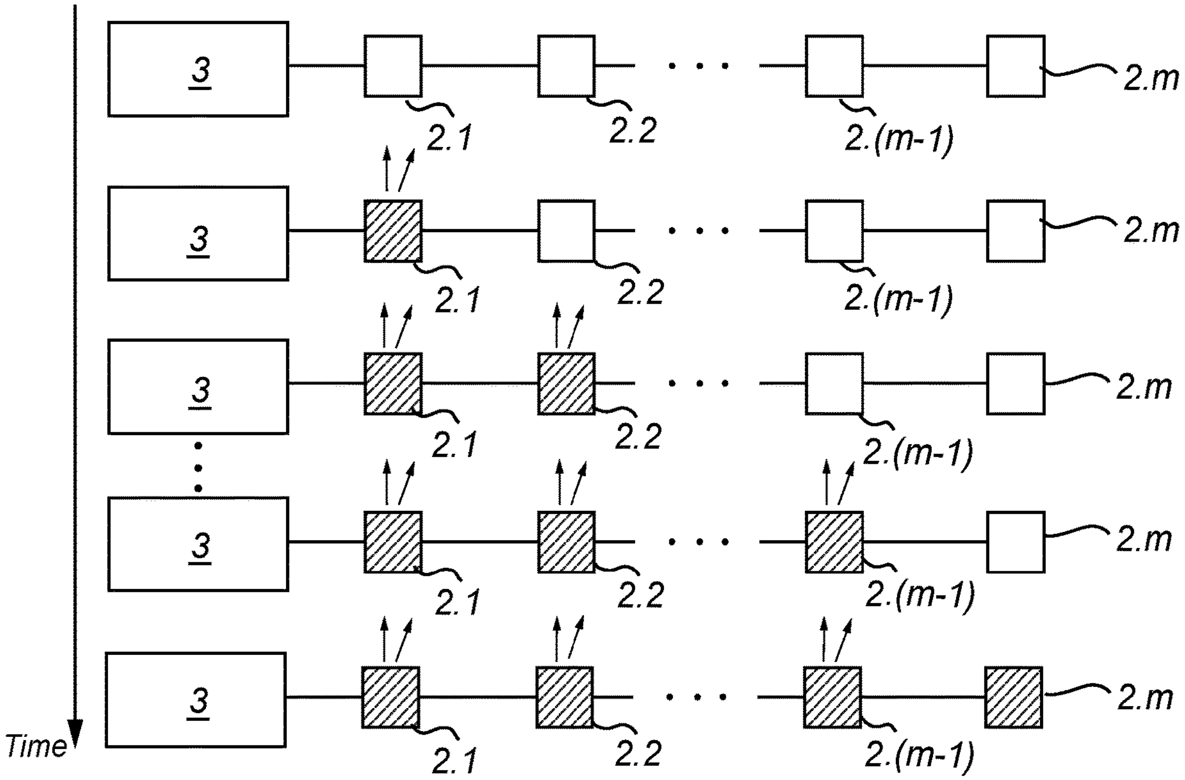
FIG. 2 shows a schematic illustration of a first example of length detection performed by a controller.
Figure 3:
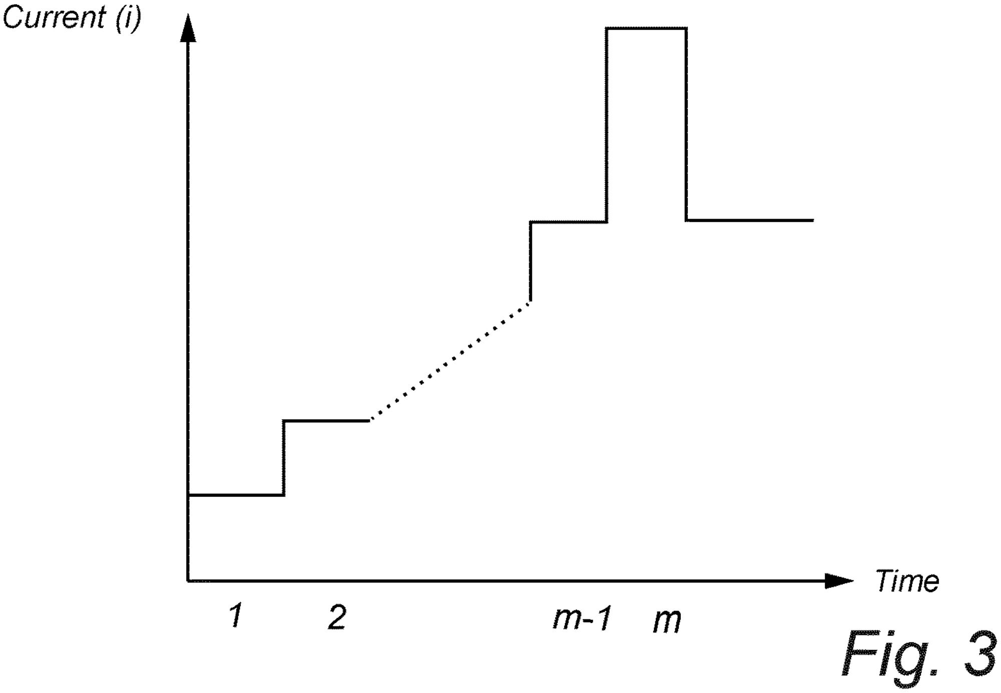
FIG. 3 shows a current consumption of the first example of FIG. 2.

In connection with FIGS. 2-3, the controller 3 configured to determine a lighting module count, i.e. the number of lighting modules 5, of the lighting unit 2, will be discuss in detail.

FIG. 2 schematically illustrates a first example of length detection performed by the controller 3. In this example, the controller 3 is configured to activate at least one module of the lighting unit 2 individually according to a preselected addressing scheme, by switching on the at least one module. For simplicity, only the controller 3 and the modules 5, 6 of the lighting device 1 are shown in FIG. 2.

In the example, the preselected addressing scheme is to activate modules 5, 6 of the lighting unit 2 sequentially. The term "sequentially" may refer to that the modules 5, 6 of the lighting unit 2 are activated one by one in an order. In this example, the modules 5, 6 are activated sequentially in an order from the 1st lighting module 5.1 until a last module at a position m of the lighting unit 2, i.e. the termination module 6. The controller 3 is configured to keep an activated module of the lighting unit 2 being activated when another module of the lighting unit 2 is activated.

Alternatively, the controller may be configured to deactivate an activated module of the lighting unit before another module of the lighting unit being activated, such that there is only one module being activated during the count detection operation. The count detection operation would be perceived as a moving flashing effect.

As shown in FIG. 2, before any module is activated by the controller 3, all the modules 5, 6 are OFF. At a first step, the 1st lighting module 5.1 is activated. The controller 3 may be configured to "incrementally" activate the modules 5, 6. At a 2nd step, both the 1st lighting module 5.1 and the 2nd lighting module 5.2 are activated. At a (m−1)th step, the 1st lighting module 5.1 until the (m−1)th lighting modules 5.(m−1) at a (m−1)th position are all activated. At a mth step, the 1st lighting module until the termination module 6 at the mth position are all activated.

Optionally, upon detection of the termination module 6, the controller 3 may deactivate the activated termination module 6.

Since each activated lighting module 5 would emit lights, the length detection process would be perceived by the user as the lighting unit 2 lighting up from the 1st lighting module 5.1 until the last lighting module 5.(m−1).

FIG. 3 shows the current passing through the lighting unit 2 corresponding to the example of FIG. 2.

Although the currents drawn by each of the lighting modules 5 may be the same or different, for simplicity, it is assumed that the current drawn by any lighting module 5 is the same in this example. Thus, following the steps of activating the modules 5, 6 in FIG. 2, the current increases step-wisely with a fixed amount of current after each lighting module 5 is activated, until the termination module 6 is activated, which causes a different increasement.

In FIG. 3, the current draws by the termination module 6 is larger than the current drawn by any lighting module 5. However, the current drawn by the termination module 6 may be lower than the current drawn by any lighting module 5.

Upon detection of the different amount of change of the current caused by activation of a present mth module, i.e. the module at the mth position, the present mth module may be determined to be the termination module 6.

The lighting module count may be determined based on a position number m of the termination unit 6. The term "position number m" may refer to a number m corresponding to the position of the module within the lighting unit. For example, the first lighting module 5.1 has a position number 1. Since each module 5, 6 of the lighting unit 2 is independently addressable and controllable by the controller 3, the controller 3 may have a unique ID associated to each module 5, 6 for individually addressing and controlling the modules 5, 6. Thus, upon detection of the mth module being the termination module 6, the position number m may be determined based on the unique ID for addressing the termination module 6.

The lighting module count may be determined based on a number of modules 5, 6 of the lighting unit 2 having been activated according to the preselected addressing scheme. The number of the activated modules 5, 6 may be counted by a counter. The counter may be an integrated part of the controller. The counter may be a separate apparatus electrically connected to the controller 3. In this example, when the mth module is determined to be the termination module 6, the number of the lighting modules 5 equals to the number of the activated lighting modules 5, which equals to m−1.

The count detection operation in this example may result in a serial illumination lighting effect. Such a lighting effect may be "hidden" in, e.g., a lighting effect caused by an initialization of lighting device 2, such that the count detection operation is "invisible" to the user as he would not perceive the count detection operation. That is, although the count detection operation causes visible lighting effects, due to that these lighting effects are a part of an expected or desired lighting effect, the count detection operation may be considered to be "invisible" to the user.

Figure 4:
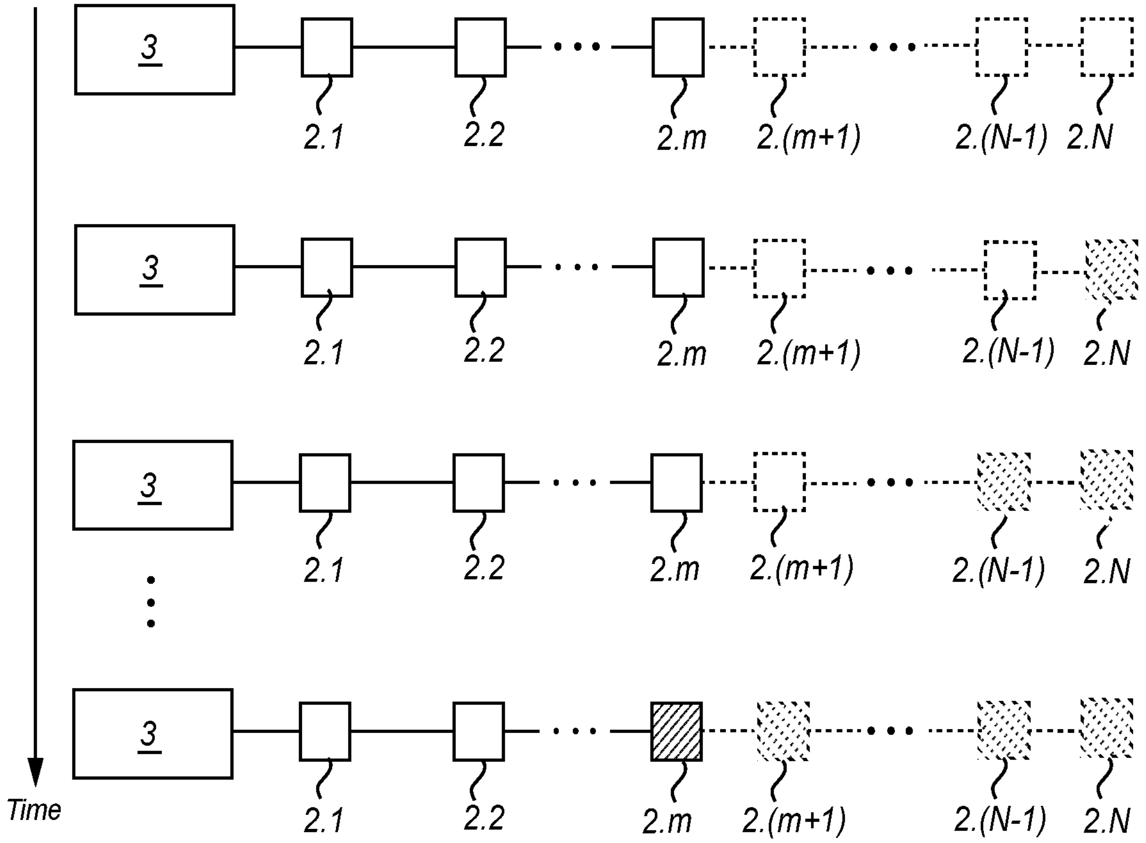
FIG. 4 shows a schematic illustration of a second example of length detection performed by a controller.

FIG. 4 schematically illustrates a second example of length detection performed by the controller 3. In this example, it is assumed that a predetermined maximum of lighting module count is known to be N, and the lighting module count is less than N. Thus, each of the positions 1-(m−1) of the lighting unit 2 has a lighting module 5 denoted 5.*x* (x=1, 2, . . . , m−1). The position m of the lighting unit 2 has a termination module 6. And the positions (m+1)-N are empty module slots as there is no module exists at these positions. The empty module slots 8 in a position y is denoted 8.*y* (y=m+1, N). In FIG. 4, the empty module slots 8 are shown in dashed lines while the existed modules 5, 6 of the lighting unit 2 are shown in solid lines.

The controller 3 may be configured to activate at least one module of the lighting unit 2 individually according to a preselected addressing scheme, by switching on the at least one module. For simplicity, only the controller 3 and the modules 5, 6 of the lighting device 1 and empty module slots 8 are shown in FIG. 4.

The preselected addressing scheme may activate modules/module slots 5, 6, 8 sequentially in an order, from the highest possible order module/module slot until the termination module 6, i.e. from the Nth module slot 8.N, i.e. the empty module slot at the position N, until the termination module 6.

As shown in FIG. 4, before any module is activated by the controller 3, all the modules are OFF. At a 1st step, the last module slot 8.N is activated. However, since the module slot 8.N has no module, no current is drawn, and no current changes can be detected. At a 2nd step, the lighting module 8.(N−1) is activated. Analogously, since the module slot 8.(N−1) has no module, no current is drawn, and no current changes can be detected.

At a (N−m+1) step, the termination module 6 is activated. Since the module slots 8.(m+1) to 8.N are empty module slots, the termination module 6 is the first "real" module being activated. Consequently, the termination modules 6 would draw a current such that a current change can be detected. Upon detection of the change of the current passing through the lighting unit 2 caused by an activation of a present mth module, i.e. the module at the position m, the present mth module may be determined to be the termination module 6.

Optionally, upon detection of the termination module 6, the controller may deactivate the activated termination module 6.

Since none of the activated modules, i.e. the empty module slots 8.(m+1) to 8.N and the termination module 6, would emit lights, the length detection operation is entirely invisible as it would not generate any lighting effects at all.

For example, the maximum of the lighting module count is 100, and the lighting module count is 10 (not known yet). Then, the module slot 11 is the termination module and the module slots 12-100 are empty module slots as the termination module 6 is the last module of the lighting unit 2. However, the controller 3 may still address and control the empty module slots 12-100, even though no current changes would happen even any number of the empty module slots being activated. The preselected addressing scheme may activate the $100^{th}$ module slot, then the $99^{th}$ module slot, until the 11th module slot being the termination module 6, when a change of the current passing through the lighting unit 2 can be detected.

For example, the maximum of the lighting module count is 100, and the lighting module count is 99 (not known yet). Then, the 100th module is the termination module. Consequently, there is no empty module slot. The preselected addressing scheme may activate the 100th module, i.e. the termination module 6, and a change of the current passing through the lighting unit 2 can be detected.

The controller 3 may be configured to "incrementally" activate the modules and/or module slots, i.e. the Nth module slot is activated, then the Nth and (N−1)th module slot are activated, until the termination module 6 is activated. Alternatively, the controller 3 may be configured to keep only one module or module slot being activated at a time. That is, an activated module or module slot may be deactivated before another module or module slot may be activated.

Figure 5:
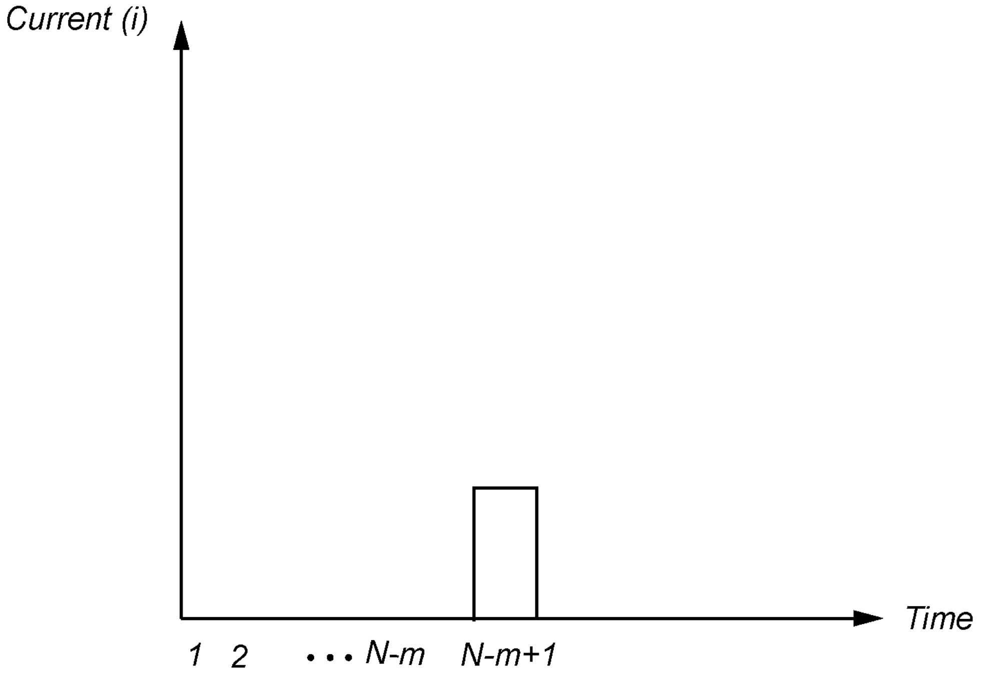
FIG. 5 shows a current consumption of the second example of FIG. 4.

FIG. 5 shows the current passing through the lighting unit 2 corresponding to the example of FIG. 4. Since the module slots 8.(m+1) to 8.N are empty slots, no current would be drawn by activating these module slots. Only after the termination module 6 is activated, a change of the current would be detected. Upon detection of the change caused by an activation of a present mth module, the present mth module may be determined to be the termination module 6.

The lighting module count may be determined based on the position number m of the termination unit 6, as discussed in the first example.

The lighting module count may be determined based on a number of the module slots 8 of the lighting unit having been activated according to the preselected addressing scheme. The number of the lighting module slots 8 been activated may be counted by a counter. The counter may be an integrated part of the controller 3. The counter may be a separate apparatus electrically connected to the controller 3. In this example, when the mth module is determined to be the termination module 6, the number of the module slots 8 having been activated N−m would be counted. Since both N and N−m is known, m can be determined. Consequently, the lighting module count equals to the number of the lighting modules 5 that not have been activated of the total N module slots of the light unit 2, i.e. N-(N−m+1)=m−1, can be determined.

In both examples, since the termination module 6 has no light sources, activating the termination module 6, regardless of switching on or off, would not cause any visible lighting effect. Thus, ending the lighting unit 2 with the termination module 6 would not influence the desired lighting effect to be generated during normal operations of the lighting device 1.

The person skilled in the art realizes that the present invention by no means is limited to the preferred embodiments described above. On the contrary, many modifications and variations are possible within the scope of the appended claims. For example, the lighting modules may be constructed in many different ways, e.g., the lighting modules may have different types, numbers and arrangements of light sources. Such details are not considered to be an important part of the present invention, which relates to the lighting module count detection.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lighting device for detecting a lighting module count of the lighting device comprising:

a lighting unit comprising a plurality of lighting modules and a termination module for terminating the light unit, which is in a form of a physical attachment, wherein the plurality of lighting modules and the termination module are connected in parallel or in series, and each lighting module comprises a light source for emitting light; and a controller for controlling the lighting unit, wherein the plurality of lighting modules and the termination module are independently controllable by the controller;

a power supply unit for providing a drive voltage to the lighting unit; characterized in that the termination module is configured to have an electrical characteristic different from that of each lighting module, such that an amount of current drawn by the termination module in response to an applied drive voltage differs from that drawn by each lighting module in response to the applied drive voltage;

wherein the controller is configured to:

activate at least one module of the lighting unit individually according to a preselected addressing scheme;

measure a change of a current passing through the lighting unit while activating the at least one module;

detect the termination module based on the measured change of the current; and determine the lighting module count of the lighting unit upon detection of the termination module.

2. The lighting device according to claim 1, wherein the preselected addressing scheme is to activate modules of the lighting unit sequentially, in an order from a $1^{st}$ lighting module of the lighting unit until a last module of the lighting unit being the termination module; and wherein when a different amount of change of the current caused by an activation of a present mth module is detected, the present mth module is determined to be the termination module.

3. The lighting device according to claim 2, wherein the controller is configured to keep an activated module of the lighting unit being activated when another module of the lighting unit is activated.

4. The lighting device according to claim 2, wherein the controller is configured to deactivate an activated module of the lighting unit before another module of the lighting unit being activated.

5. The lighting device according to claim 1, wherein a predetermined maximum of lighting module count is N, and the lighting module count is less than N;

wherein the preselected addressing scheme is to activate modules of the lighting unit sequentially, in an order from a last module slot of the lighting unit being a Nth module slot until the termination module;

wherein when a change of the current passing through the lighting unit caused by an activation of a present mth module is detected, the present mth module is determined to be the termination module.

6. The lighting device according to claim 1, wherein the lighting module count is determined based on a position number m of the termination unit.

7. The lighting device according to claim 1, wherein the lighting module count is determined based on a number of modules and/or module slots of the lighting unit having been activated according to the preselected addressing scheme.

8. The lighting device according to claim 1, wherein the controller is configured to activate the at least one module by applying the drive voltage over the at least one addressed module.

9. The lighting device according to claim 1, wherein the controller comprises a sensor for measuring the change of the current passing through the lighting unit.

10. The lighting device according to claim 9, wherein the sensor comprises an ammeter.

11. The lighting device according to claim 1, wherein the electrical characteristic comprises a resistance.

12. The lighting device according to claim 1, wherein each of the plurality of lighting modules is a pixelated light module, and the lighting unit is a pixelated light strip.

13. The lighting device according to claim 1, wherein the light source comprises a light emitting diode, LED.

14. The lighting device according to claim 1, wherein each lighting module and the termination module comprise a respective module controller for communicating with the controller, and controlling the respective module.

15. A method for detecting a lighting module count of a lighting device, the lighting device comprising:

a lighting unit comprising a plurality of lighting modules and a termination module for terminating the light unit, which is in a form of a physical attachment, wherein the plurality of lighting modules and the termination module are connected in parallel or in series, and each lighting module comprises a light source for emitting light; and a controller for controlling the lighting unit, wherein the plurality of lighting modules and the termination module are independently controllable by the controller;

a power supply unit for providing a drive voltage to the lighting unit;

wherein the termination module is configured to have an electrical characteristic different from that of each lighting module, such that an amount of current drawn by the termination module in response to an applied drive voltage differs from that drawn by each lighting module in response to the applied drive voltage;

wherein the method comprises:

activating at least one module of the lighting unit individually according to a preselected addressing scheme;

measuring a change of a current passing through the lighting unit while activating the at least one module;

detecting the termination module based on the measured change of the current; and determining the lighting module count of the lighting unit upon detection of the termination module.

* * * * *